United States Patent [19]

Burlett et al.

[11] Patent Number: 4,481,337
[45] Date of Patent: Nov. 6, 1984

[54] PROCESS FOR THE PREPARATION OF MODIFIED POLYMERS

[75] Inventors: Donald J. Burlett, Akron; Dane K. Parker, Massillon, both of Ohio

[73] Assignee: The Goodyear Tire & Rubber Company, Akron, Ohio

[21] Appl. No.: 533,717

[22] Filed: Sep. 19, 1983

[51] Int. Cl.$^3$ .......................................... C08F 114/02
[52] U.S. Cl. ............................. 525/340; 525/359.1; 525/379; 525/331.4
[58] Field of Search ................... 525/340, 359.1, 379, 525/331.4

[56] References Cited

U.S. PATENT DOCUMENTS

| | | | |
|---|---|---|---|
| 2,694,702 | 11/1954 | Jones | 525/379 |
| 3,022,253 | 2/1962 | McMaster | 525/379 |
| 3,168,502 | 2/1965 | Sexsmith et al. | 525/340 |
| 4,074,035 | 2/1978 | Powers et al. | 525/340 |

Primary Examiner—Paul R. Michl
Assistant Examiner—A. H. Walker
Attorney, Agent, or Firm—D. O. Nickey

[57] ABSTRACT

There is disclosed a process for the modification of a polymer having pendant halo-benzyl groups comprising
(a) contacting said polymer with a quaternary ammonium or phosphonium salt and an alkali ionizable molecule containing anti-degradant properties thereafter
(b) contacting the resultant mixture with an alkaline compound.

17 Claims, No Drawings

PROCESS FOR THE PREPARATION OF MODIFIED POLYMERS

PRIOR ART

It is well known that in most elastomers, it is important to incorporate antidegradant compounds in order to stabilize the elastomer against oxidation by air or certain oxidizing substances. One of the problems of antidegradant technology has been the physical loss of antidegradants from the elastomers, chiefly through volitilization and/or extraction. As a result of this problem for certain elastomers, it has been necessary to utilize an antidegradant compound that apart from having good antidegradant activity, possesses good solubility in the formulations of the elastomer. The problem of selection of the antidegradant has been somewhat eliminated by development of higher molecular weight antidegradants. Several known antidegradants are available which have a molecular weight near 1,000.

There are two known methods by which chemical bonding of an antidegradant to an elastomer network has been accomplished. One is the direct reaction of an antidegradant, or an incipient antidegradant, with an elastomer and the other is incorporation of an antidegradant monomer during formation of an elastomer. An example of the first method is the reaction of aromatic nitroso compounds with natural rubber.

SUMMARY OF THE INVENTION

The present invention provides a process for the production of polymer bound anti-degradants. The inventor has unexpectedly found that by reacting a polymer having a pendant halo-benzyl group with a quaternary ammonium or phosphonium salt and an alkali ionizable molecule containing antidegradant properties and thereafter contacting the resultant mixture with an alkaline compound, one can achieve a high level of incorporation of the antidegradant moiety into the polymer.

DESCRIPTION OF THE PREFERRED EMBODIMENT

There is disclosed a process for the modification of a polymer having pendant halo-benzyl groups comprising
 (a) combining said polymer with a quaternary ammonium or phosphonium salt as a catalyst and an alkaline ionizable molecule containing antidegradant properties thereafter
 (b) combining the resultant mixture with an alkaline compound at a reaction temperature of from 10° to 120° C. and in the presence of a nitrogen atmosphere to yield said modified polymer having covalently bonded antidegradant functionality.

Also disclosed is a process for the modification of a halomethylated polymer wherein said polymer comprises
 (a) 0 to 39.9 parts by weight of styrene,
 (b) 60 to 99.9 parts by weight of butadiene,
 (c) 0.1 to 40 parts by weight of a monomer having a vinyl group and a halo-benzyl group, comprising combining said polymer with a catalytic quaternary ammonium or phosphonium salt and an alkaline ionizable molecule containing antidegradant properties thereafter combining the resultant mixture with an aqueous alkaline solution from 10% to saturation at a reaction temperature of from 10° to 120° C. and in the presence of a nitrogen atmosphere, to yield said polymer having covalently bonded antidegradant functionality.

The present invention is a process which is based on nucleophilic displacement usually of a halogen and is generally conducted by stirring two liquid phases; an organic phase containing the substrate polymer and a concentrated aqueous phase of the anion to be transferred all in the presence of a quarternary salt catalyst.

The desired halogen containing polymer substrate can be obtained by polymerizing a halogen containing monomer with other monomers or mixtures of monomers capable of homopolymerization, copolymerization or interpolymerization by free-radical mechanism. For example, para and meta vinylbenzyl chloride can be copolymerized with styrene and butadiene to produce a halogen containing SBR. Other suitable monomers are conjugated dienes containing four to six or up to for example ten carbon atoms. Examples of such monomers are 1,3-butadiene; 2-ethyl-1,3-butadiene; 2,3-dimethyl-1,3-butadiene; isoprene, piperylene; 1,3-hexadienes; 1,3-decadienes; and vinylic monomers including styrene, α-methyl styrene, divinylbenzene, and acrylonitrile.

The level of antidegradant incorporation is limited by the number of halo-functional groups on the polymer that can be used for attachment of the antidegradant functionality to the polymer. Accordingly, the amount of pendant halo-benzyl groups on the polymer is directly related to the level of incorporation of the antidegradant. Preferably amounts from 0.1% to 45% by weight of antidegradants are bound to the rubber.

It should be understood that more than one antidegradant may be reacted with the rubber to give a polymer with different bound antidegradants.

A polymer having a pendant halo-benzyl group may also be treated as a solvent cement solution with concentrated aqueous solutions of salts containing an antidegradant functional group in the presence of a phase transfer catalyst to yield a polymer-bound antidegradant by liquid-liquid phase transfer catalysis.

Examples of various quaternary salts that are useful in the present invention are compounds of the general structural formula:

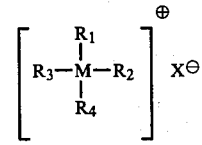

wherein M is either nitrogen or phosphorus and $X^\ominus$ is selected from the group of radicals comprising chloride, bromide, fluoride, iodide, acetate, alkoxide and hydroxide and wherein $R_1$, $R_2$, $R_3$ and $R_4$ are monovalent hydrocarbon radicals. The total number of carbon atoms in $R_1$, $R_2$, $R_3$ and $R_4$ should be from 14 to 70. Some specific examples of the quaternary salts are tetrabutyl ammonium bromide, trioctyl methyl ammonium chloride, tri-n-butyl hexadecyl phosphonium bromide, tri-n-butyl methyl ammonium chloride, tetraheptyl ammonium iodide and tricaprylyl methyl ammonium chloride.

Additional information on typical phase transfer catalysts can be found in *Phase Transfer Catalysis Principles and Techniques* by C. Stark and C. Liotta, Chapter 3, Page 57, Academic Press, 1978, and *Phase Transfer*

*Catalysis in Organic Synthesis* by W. Weber and G. Gokel, Chapter 1, Springer-Verlag, 1977.

Examples of the aqueous alkali compound useful in the present invention are aqueous solutions of NaOH, NaHCO₃, KOH, K₂CO₃, Na₂CO₃ and KHCO₃.

Strong nonaqueous alkaline suspensions can be used as an alternative to aqueous alkaline solutions. Examples the source of the alkaline compound in the nonaqueous state are NaH, KH, LiH, Na, Li, K, NaOH, NaHCO₃, KOH, K₂CO₃, Na₂CO₃ and K₂HCO₃.

Examples 18-21 infra describe a solid-liquid phase transfer system which utilizes non-aqueous alkaline compounds.

The temperature at which the reaction is carried out should not exceed 120° C. with a temperature of from 60° to 80° C. being preferred.

It is advantageous to exclude oxygen from the reaction with the halomethylated rubber, however, small amounts of oxygen can be tolerated as an impurity in the inert atmosphere.

Various reaction solvents can be used in the practice of the present invention. Some examples are toluene, dimethyl formamide, benzene, xylene, chloroform, ortho dichlorobenzene.

The alkali ionizable molecules containing antidegradant properties includes those antidegradants of the amine and the hindered phenolic classes. These known antidegradants are generally known by the term chain-breaking antioxidants, however, other antioxidants commonly known as peroxide-decomposing antioxidants, ultraviolet screening agents, triplet quenchers and metal deactivators are contemplated herein. Some examples of chain-breaking antioxidants are represented by the following formulas:

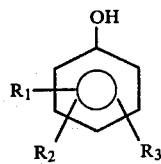

wherein $R_1$ and $R_2$ are the same or different radicals selected from the group consisting of hydrogen, alkyl, cycloalkyl, aralkyl or aryl and wherein $R_3$ is selected from:

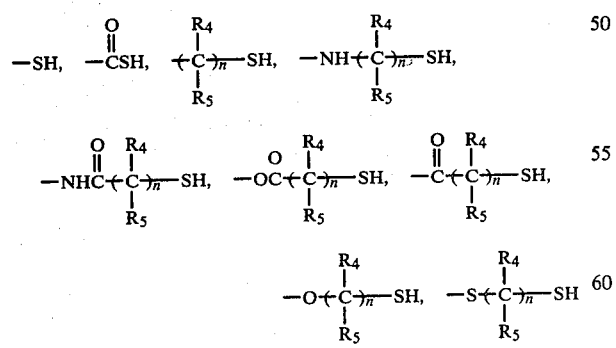

wherein n equals 1-12, $R_4$ and $R_5$ are the same or different radical selected from hydrogen and hydrocarbon radicals having from 1 to 20 carbon atoms.

Other compounds useful in this invention are compounds such as:

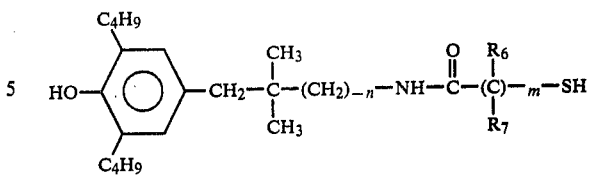

wherein n equals 0 to 1, m is 1 or 2 and $R_6$ and $R_7$ are the same or different radicals selected from the group consisting of hydrogen and radicals having 1 to 10 carbon atoms, and;

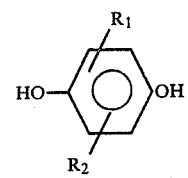

wherein $R_1$ and $R_2$ are the same or different radicals selected from the group comprising hydrogen and hydrocarbon radicals having 1 to 18 carbon atoms, and

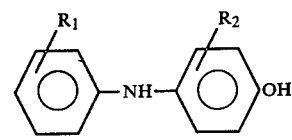

wherein $R_1$ and $R_2$ are teh same or different radicals selected from the group comprising hydrogen and hydrocarbon radicals having 1 to 18 carbon atoms.

It should be understood that the alkali ionizable molecules containing antidegradant properties can be replaced with other alkali ionizable molecules containing other desirable properties or functionalities: Examples of other properties are those compounds which act as accelerators, plasticizers, synergists, chelators, dyes, fungicides, bactericides and flame retardants.

Representative of other alkali ionizable molecules that are useful in the present invention are those mercapto phenolic substituted derivatives of accelerators, fungicides, etc. More specifically compounds such as the following are useful.

UV ABSORBERS

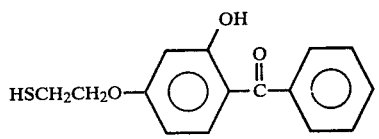

substituted 2-hydroxy benzophenones

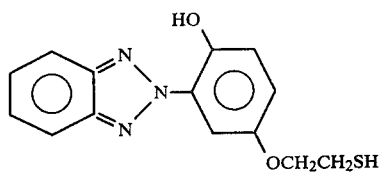

substituted hydroxyphenyl benzotriazoles

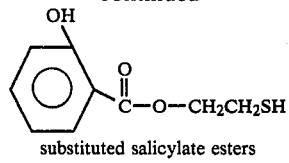
substituted salicylate esters

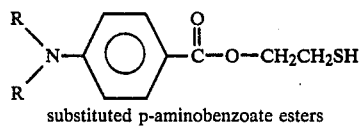
substituted p-aminobenzoate esters

ACCELERATORS

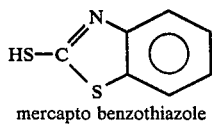
mercapto benzothiazole

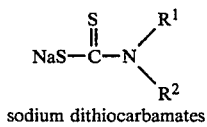
sodium dithiocarbamates

FUNGICIDES

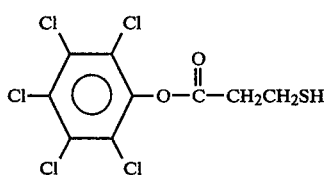
substituted pentachlorophenol derivates

SYNERGISTS

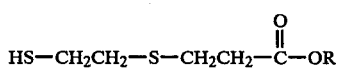

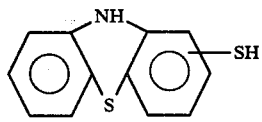

DYES
mercapto substituted phthalocyanines
mercapto substituted azo dyes

CHELATORS

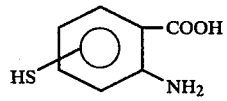
mercapto substituted porphyins, phthalocyanines

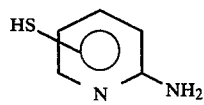

The following examples are supplied in order to illustrate, but not necessarily to limit, the process of the present invention.

In the following examples, the antidegradants listed in Table I were used.

TABLE I

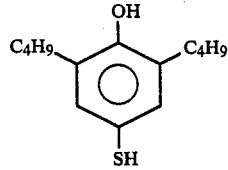
A

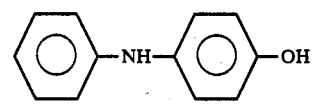
B

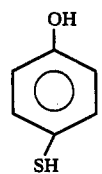
C

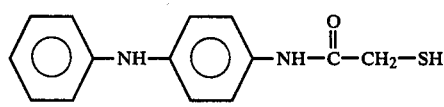
D

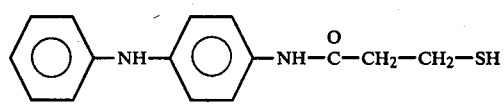
E

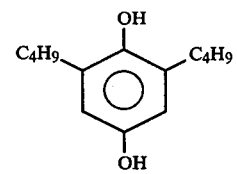
F

EXAMPLES 1–5

To a 250 milliliter flask, equipped with a thermometer, mechanical stirrer and condenser was added 10 grams of polystyrene (Bio-beads SX-1, 1% crosslinked, 1.25 meq/g chlorine), 0.025 mol of an antidegradant selected from Table I, 150 milliliters solvent (toluene or dimethyl formamide) and 0.3 grams tetrabutyl ammonium bromide (NBu4Br). This mixture was stirred and purged with nitrogen. To the mixture was added 2 grams of 50% aqueous sodium hydroxide. The reaction mixture was stirred under nitrogen at 70° C. for 18 hours. The reaction mixture was filtered on a glass frit and the collected polystyrene beads were washed successively with methanol, then water, then methanol and then methanol:methylene chloride solution with a mix ratio of 3:1, 1:1 and 1:3 and acetone. The beads were air dried overnight and analyzed.

Table II lists the specific antidegradant used as well as other data for Examples 1–5.

TABLE II

| | Examples | | | | |
|---|---|---|---|---|---|
| | 1 | 2 | 3 | 4 | 5 |
| Antidegradant from Table I | E | E | B | E | F |
| Reaction Solvent | TOL | DMF | DMF | DMF | DMF |
| Reaction Temperature °C. | 110 | 150 | 70 | 70 | 70 |
| Product Resin Analysis | | | | | |

TABLE II-continued

| | Examples | | | | |
|---|---|---|---|---|---|
| | 1 | 2 | 3 | 4 | 5 |
| Weight Gain (grams) | 4.3 | 3.4 | 2.2 | 2.8 | 2.0 |
| % Cl by wt. | .12 | .024 | .055 .0062 | 483 | |
| % N by wt. | 2.51 | 2.48 | 1.75 | 2.15 | — |
| % S by wt. | 3.46 | 3.81 | — | 3.16 | — |

EXAMPLES 6–9

To a 500 milliliter flask equipped with a thermometer, condenser and mechanical stirrer was added 200 grams of polymer solution (13.1% polymer by wt. in dimethyl formamide), 0.05 mol of antidegradant, 100 milliliters of the reaction solvent and 0.5 grams of tetrabutyl ammonium bromide. The mixture was stirred and purged with nitrogen. To this solution was added 4 grams of 50% aqueous sodium hydroxide and the resulting mixture was stirred at 70° C. under nitrogen for 4 to 5 hours. The solution was poured drop-wise into 2.5 liters of methanol and the precipitated polymer was collected on a sieve. The polymer was washed with methanol and dried. A small sample was redissolved in toluene and reprecipitated for analytical purposes.

Table III lists the specific antidegradants used as well as other data for Examples 6–9.

TABLE III

| | Examples | | | |
|---|---|---|---|---|
| | 6 | 7 | 8 | 9 |
| Antidegradant | B | C | D | F |
| Reaction solvent | DMF | DMF | DMF | DMF |
| Reaction Temperature | 70° | 70° | 70° | 70° |
| Product Resin Analysis | | | | |
| Weight Gain (grams) | — | — | 1.28 | — |
| % Cl by wt. | .124 | .569 | .467 | .518 |
| % N by wt. | 1.63 | — | 3.69 | — |
| % S by wt. | — | 3.70 | 3.19 | — |
| Final Antidegradant mole/g of resin | .00116 | .00116 | .00099 | .00104 |

EXAMPLE 10

To a 500 milliliter flask equipped with a thermometer, condenser, and mechanical stirrer, was added 200 grams of polymer solution (13.1% polymer by wt. solution in toluene), 0.5 mole of antidegradant A (see Table I), 100 milliliters of toluene and 0.5 grams of tetrabutyl ammonium bromide. The mixture was stirred and purged with nitrogen. To this solution was added 4 grams of 50% aqueous sodium hydroxide and the resulting mixture was stirred at 110° C. under nitrogen for 4 to 5 hours. The solution was poured drop-wise into 2.5 liters of methanol and the precipitated polymer was collected on a sieve. The polymer was washed with methanol and dried. A small sample was redissolved in toluene and reprecipitated for analytical purposes.

Table IV lists the data for Example 10.

TABLE IV

| Product Resin Analysis | |
|---|---|
| Weight Gain (grams) | 1.9 |
| % Cl by wt. | .16 |
| % N by wt. | — |
| % S by wt. | 3.32 |
| Final Antidegradant Mole/Grams of Resin | .00124 |

EXAMPLES 11–15 NON-AQUEOUS REACTION

Chloromethylated styrene butadiene rubber (SBR) was prepared by replacing 100% of the styrene with vinylbenzyl chloride in a standard emulsion polymerization.

To a 500 milliliter flask equipped with condenser, mechanical stirrer, thermometer and nitrogen purge set-up was added 200 grams of the chloromethylated SBR solution wherein all the styrene was replaced with the vinyl benzyl chloride (2% solution by weight in toluene). The apparatus was purged with nitrogen. To this solution was added 0.0047 moles of antidegradant, 0.11 grams of sodium hydride and 0.3 grams of tetra-n-butyl ammonium bromide. The mixture was heated at 65° to 70° C. for about 18 hours under nitrogen. The reaction mixture was poured slowly with stirring into 2 liters of methanol and the rubber was collected on a sieve. The product was washed with methanol and then dried overnight under an aspirator vacuum.

Table V lists the specific antidegradant used as well as other data for Examples 11–15.

TABLE V

| | Examples | | | | |
|---|---|---|---|---|---|
| | 11 | 12 | 13 | 14 | 15 |
| Antidegradant | A | D | C | F | B |
| Reactant Ratio | | | | | |
| Polymer-CH₂Cl | 1.0 | 1.0 | 1.0 | 1.0 | 1.0 |
| Base | .75 | .75 | 1.5 | 1.5 | .45 |
| Antidegradant | 1.5 | 1.5 | 1.5 | 1.5 | .45 |
| Gelling Analysis | No | Yes | Yes | Yes | Yes |
| % Cl by wt. | 1.43 | .97 | 2.22 | 2.28 | — |
| % N by wt. | — | 1.19 | 1.02 | — | — |
| % S by wt. | 3.50 | 3.20 | — | — | — |
| Parts of antidergradant per hundred parts of rubber. | 35 | 12.3 | 4.2 | — | — |

EXAMPLES 16–17

To a 500 milliliter flask equipped with condenser, mechanical stirrer, thermometer and nitrogen purge set-up was added 200 grams chloromethylated SBR solution (prepared as in Examples 11–15) and the solution was purged with nitrogen. In a separate vessel was added 0.11 grams of sodium, 40 milliliters of methanol under a nitrogen purge. To this solution was added 0.0047 moles of antidegradant and the methanol was then distilled off. The solid residue was then dissolved in 15 milliliters of DMF and this solution was then added to the 500 milliliter flask containing the chloromethylated SBR. 0.3 grams of tetra-n-butyl ammonium bromide was also added to the flask. The reaction mixture was heated to 65°–70° C. for about 18 hours under nitrogen. The reaction mixture was poured slowly with stirring into 2 liters of methanol and collected on a sieve. The product was washed with methanol and then dried overnight under an aspirator vacuum.

Below is listed the data for Examples 16 and 17.

TABLE VI

| | Examples | |
|---|---|---|
| | 16 | 17 |
| Antidegradant | D | B |
| Reaction Ratio | | |
| Polymer - CH₂Cl | 1 | 1 |
| Base | 7.5 | 1.5 |

TABLE VI-continued

| | Examples | |
|---|---|---|
| | 16 | 17 |
| Antidegradant | .75 | 1.5 |
| Gelling | Yes | Yes |
| Analysis | | |
| % Cl by wt. | 1.68 | 4.55 |
| % N by wt. | — | .34 |
| % S by wt. | 2.56 | — |
| Parts of antidegradant per hundred parts of rubber | 26 | 4.7 |

EXAMPLES 18-19

Chloromethylated styrene butadiene rubber (SBR) was prepared by replacing styrene with vinylbenzyl chloride in a standard emulsion polymerization. 40% of the styrene was replaced with vinylbenzyl chloride.

To a 500 milliliter flask equipped with condenser, mechanical stirrer, thermometer and nitrogen purge set-up, was added 200 grams of the chloromethylated SBR (prepared above) solution (2% solution in toluene) and the solution was purged with nitrogen. To this solution was added 0.0047 moles of antidegradant, 0.09 grams of sodium hydroxide and 0.2 grams of tetra-n-butyl ammonium bromide. The mixture was heated to 65°-70° C. for around 18 hours under nitrogen. The reaction mixture was pouredly slowly with stirring into 2 liters of methanol and collected on a sieve. The product was washed with methanol and then dried overnight under an aspirator vacuum.

Below is listed the specific antidegradant used as well as other data for Examples 18-19.

TABLE VII

| | Examples | |
|---|---|---|
| | 18 | 19 |
| Antidegradant | A | C |
| Reaction Ratio | | |
| Polymer - CH$_2$Cl | 1.0 | 1.0 |
| Base | .8 | .8 |
| Antidegradant | 1.5 | 1.5 |
| Gelling | No | No |
| Analysis | | |
| % Cl by wt. | .13 | .77 |
| % N by wt. | — | — |
| % S by wt. | 1.73 | 1.07 |
| Parts of antidegradant per hundred parts of rubber | 14.8 | 4.4 |

EXAMPLES 20-21

To a 500 milliliter flask equipped with condenser, mechanical stirrer, thermometer and nitrogen purge set-up was added 200 grams of chloromethylated SBR solution (prepared in Examples 18 and 19) and the solution was purged with nitrogen. To this solution was added 0.0047 moles of antidegradant, 0.11 grams (0.0047 mol) of sodium hydride and 0.3 grams of tetra-n-butyl ammonium bromide. The mixture was heated at 65° to 70° C. for about 18 hours under nitrogen. The reaction mixture was poured slowly with stirring into 2 liters of methanol and collected on a sieve. The product was washed with methanol and then dried overnight under an aspirator vacuum. Below is listed the specific antidegradant used as well as other data for Examples 20-21.

TABLE VIII

| | Examples | |
|---|---|---|
| | 20 | 21 |
| Antidegradant | F | B |
| Reactant Ratio | | |
| Polymer - CH$_2$Cl | 1 | 1 |
| Base | 1.5 | 1.5 |
| Antidegradant | 1.5 | 1.5 |
| Gelling | No | No |
| Analysis | | |
| % Cl by wt. | .71 | .98 |
| % N by wt. | — | .40 |
| % S by wt. | — | — |
| Parts of antidegradant per hundred parts of rubber | — | 5.6 |

EXAMPLE 22

To a 500 milliliter flask equipped with condenser, mechanical stirrer, thermometer and nitrogen purge set-up was added 200 grams chloromethylated SBR solution (prepared as in Examples 18-19) and the solution was purged with nitrogen. In a separate vessel was added 0.11 grams of sodium, 40 milliliters of methanol under a nitrogen purge. To this solution was added 0.0047 moles of antidegradant D (See Table I) and the methanol was then distilled off. The solid residue was then dissolved in 15 milliliters of DMF and this solution was then added to the 500 milliliter flask containing the chloromethylated SBR. 0.3 grams of tetra-n-butyl ammonium bromide was also added to the flask. The reaction mixture wa heated to 65°-70° C. for around 18 hours under nitrogen. The reaction mixture was poured slowly with stirring into 2 liters of methanol and collected on a sieve. The product was washed with methanol and then dried overnight under an aspirator vacuum.

Below is listed the physical data for Example 22.

TABLE IX

| Reactant Ratio | |
|---|---|
| Polymer - CH$_2$Cl | 1.0 |
| Base | 1.5 |
| Antidegradant | 1.5 |
| Gelling | No |
| Analysis | |
| % Cl by wt. | .04 |
| % N by wt. | 1.35 |
| % S by wt. | 1.94 |
| Parts of antidegradant per hundred parts of rubber | 14.1 |

In order to further illustrate the advantages of the present invention the following examples were run.

EXAMPLE 23

50 grams of 4% chloromethylated SBR (8.6% in toluene; 0.0011 mole) is diluted with 100 ml of toluene, 3.03 grams of hydroxydiphenylamine (0.164 moles) and 0.25 grams of 50% aqueous sodium hydroxide were added. To this solution was added 0.1 gram of NBu$_4$Br. The solution was then stirred under a nitrogen atmosphere at 70° C. for 18 hours. The solution was then coagulated by slowly adding an excess of isopropyl alcohol. The coagulate rubber sample was then extracted for 18 hours with acetone. The sample was then dryed at 60° C. in an aspirator vacuum oven for 8 hours. The rubber was analyzed and had 0.24 weight percent of nitrogen.

EXAMPLE 24

The same procedure as in Example 23 was repeated with the exception of no NBu4Br was added. the rubber was analyzed and had 0.13 weight percent of nitrogen.

The following samples were placed in a thimble in a Soxhlet Extractor and extracted with methanol for 48 hours. The samples were removed, dried under an aspirator vacuum at room temperature and were analyzed. See Table X below for results.

TABLE X

| Example | Before Extraction % S | Before Extraction % N | After Extraction % S | After Extraction % N | % Retained |
|---|---|---|---|---|---|
| 11 | 3.50 | — | 3.12 | — | 90 |
| 18 | 1.73 | — | 1.65 | — | 95 |
| 19 | 1.07 | — | 1.09 | — | 100 |
| 21 | — | .40 | — | .45 | 100 |
| 22 | 1.94 | 1.35 | 1.82 | 1.26 | 94 |

EXAMPLES 25

The same procedure as Example 23 is repeated except that the hydroxy-diphenylamine is replaced with β-mercaptoethyl-salicylate which yields a rubber having a pendant U.V. stabilizer functionality.

While certain representative embodiments and details have been shown for the purpose of illustrating the invention, it will be apparent to those skilled in this art that various changes and modifications may be made therein without departing from the scope of the invention.

We claim:

1. A process for the modification of a polymer having pendent halo-benzyl groups comprising
   (a) combining said polymer with a quaternary ammonium or phosphonium salt as a catalyst and an alkaline ionizable molecule containing antidegradant properties thereafter
   (b) combining the resultant mixture with an alkaline compound at a reaction temperature of from 10° to 120° C. and in the presence of a nitrogen atmosphere to yield said modified polymer having covalently bonded antidegradant functionality.

2. A process for the modification of a halomethylated polymer wherein said polymer comprises
   (a) 0 to 39.9 parts by weight of styrene,
   (b) 60 to 99.9 parts by weight of butadiene,
   (c) 0.1 to 40 parts by weight of a monomer having a vinyl group and a halo-benzyl group, comprising combining said polymer with a catalytic quaternary ammonium or phosphonium salt and an alkaline ionizable molecule containing antidegradant properties thereafter combining the resultant mixture with an aqueous alkaline solution from 10% to saturation at a reaction temperature of from 10° to 120° C. and in the presence of a nitrogen atmosphere, to yield said polymer having covalently bonded antidegradant functionality.

3. The process of claim 1 wherein said polymer having pendent halo-benzyl groups is chloromethylated polystyrene.

4. The process of claim 1 wherein said quarternary ammonium or phosphonium salt is selected from the general structural formula:

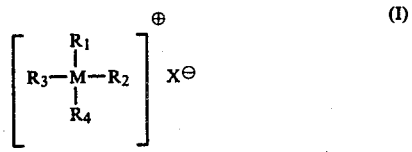

wherein $M^{\oplus}$ is either nitrogen or phosphorus and $X^{\ominus}$ is selected from the group of radicals comprising chloride, bromide, fluoride, iodide, acetate, alkoxide and hydroxide and wherein $R_1$, $R_2$, $R_3$ and $R_4$ are nonovalent hydrocarbon radicals and where the total number of carbon atoms in $R_1$, $R_2$, $R_3$ and $R_4$ is from 14 to 70.

5. The process of claim 4 wherein said ammonium salt is tetrabutyl ammonium bromide.

6. The process of claim 1 wherein said alkaline ionizable molecule is a chain-breaking antioxidants.

7. The process of claim 5 wherein said chain-breaking antioxidant is 4-mercaptopropionamido diphenylamine.

8. The process of claim 5 wherein said chain-breaking antioxidant is 2,6-di-t-butyl-4-mercaptophenol.

9. The process of claim 5 wherein said chain-breaking antioxidant is 4-mercaptophenol.

10. The process of claim 5 wherein said chain-breaking antioxidant is para-hydroxydiphenylamine.

11. The process of claim 5 wherein said chain-breaking antioxidant is N(4-anilino phenyl)-2-mercaptoacetamide.

12. The process of claim 5 wherein said chain-breaking antioxidant is 2,6-di-t-butylhydroquinone.

13. The process of claim 1 wherein said alkaline compound is an aqueous alkaline solution from 30–50% by weight.

14. The process of claim 13 wherein said aqueous alkaline solution is aqueous sodium hydroxide.

15. The process of claim 13 wherein said aqueous alkaline solution is aqueous potassium hydroxide.

16. The process of claim 1 wherein reaction temperatures is from 60° to 80° C.

17. The process of claim 1 wherein said alkaline compound is a nonaqueous compound selected from the group NaH, KH, LiH, Na, Li, K, NaOH, NaHCO3, KOH, K2CO3, Na2CO3 and K2HCO3.

* * * * *